(12) United States Patent
Essl et al.

(10) Patent No.: US 11,409,928 B2
(45) Date of Patent: Aug. 9, 2022

(54) CONFIGURABLE DIGITAL TWIN

(71) Applicant: Siemens Aktiengesellschaft, Munich (DE)

(72) Inventors: Alexander Essl, Erlangen (DE); Christian Heuer, Seevetal (DE); Markus Schuler, Schwabach (DE)

(73) Assignee: Siemens Aktiengesellschaft, Munich (DE)

( * ) Notice: Subject to any disclaimer, the term of this patent is extended or adjusted under 35 U.S.C. 154(b) by 104 days.

(21) Appl. No.: 17/075,906

(22) Filed: Oct. 21, 2020

(65) Prior Publication Data
US 2021/0117593 A1    Apr. 22, 2021

(30) Foreign Application Priority Data
Oct. 21, 2019  (EP) ..................................... 19204342

(51) Int. Cl.
*G06F 3/00*      (2006.01)
*G06F 30/20*    (2020.01)
*G06F 16/23*    (2019.01)

(52) U.S. Cl.
CPC .............. *G06F 30/20* (2020.01); *G06F 16/23* (2019.01)

(58) Field of Classification Search
CPC ...................................................... G06F 17/50
USPC ............................................................ 703/1
See application file for complete search history.

(56) References Cited

U.S. PATENT DOCUMENTS

2007/0078634 A1 *  4/2007  Krishnapillai .......... G06F 30/00 703/2
2018/0330029 A1 * 11/2018  Pedersen ................. G06F 30/23

OTHER PUBLICATIONS

G. P. Gujarathi, Generative CAD and CAE Integration Using Common Data Model. (Year: 2010).*

(Continued)

*Primary Examiner* — Lechi Truong
(74) *Attorney, Agent, or Firm* — Laurence A. Greenberg; Werner H. Stemer; Ralph E. Locher

(57) ABSTRACT

A method simulates aspects of a system. The method includes: (a) creating models of a system, wherein each individual model describes a specific aspect of the system, (b) determining for each model an initial first data record containing specific data used only by the model and an initial second data record containing common data used by the model and at least one other model, (c) selecting a first model and a second model, (d) determining updated first and second data records on the basis of the initial first data record for the first model and the initial second data records, and (e) determining updated first and second data records for the second model based on the initial first data record for the second model, the updated second data record for the first model and the initial second data records for all of the models except for the first model.

7 Claims, 2 Drawing Sheets

(56) References Cited

OTHER PUBLICATIONS

Palensky, Peter et al: "Cosimulation of Intelligent Power Systems: Fundamentals, Software Architecture, Numerics, and Coupling"; IEEE Industrial Electronics Magazine; IEEE; US; vol. 11; No. 1; pp. 34-50; XP011643437; ISSN: 1932-4529; DOI:10.1109/MIE.2016.2639825; [gefunden am Mar. 21, 2017]; Abstract; Figures 11,13; the whole document; 2017.

Farhat, Charbel et al: "Provably second-order time-accurate loosely-coupled solution algorithms for transient nonlinear computational aeroelasticity"; Elsevier; Computer Methods in Applied Mechanics and Engineering; North-Holland, Amsterdam, NL; vol. 195; No. 17-18; Mar. 15, 2006; pp. 1973-2001; XP027904791; ISSN: 0045-7825; DOI:10.1016/j.cma.2004.11.031; [gefunden am Mar. 15, 2006]; Abstract; pp. 1974, Paragraph 2; Figure 1; the whole document; 2006.

\* cited by examiner

CONFIGURABLE DIGITAL TWIN

CROSS-REFERENCE TO RELATED APPLICATION

This application claims the priority, under 35 U.S.C. § 119, of European application EP 19 204 342, filed Oct. 21, 2019; the prior application is herewith incorporated by reference in its entirety.

BACKGROUND OF THE INVENTION

Field of the Invention

The present invention relates to the technical field of the simulation of real systems. The present invention relates in particular to a method for simulating a plurality of aspects of a system. The present invention relates furthermore to an apparatus and a computer program for performing the method.

A "digital twin" is a representation of a real system in a digital context (IT system) with the opportunity to set the time (i.e. to look at the system quickly or slowly from the past through the present to the future).

Real systems can already be modelled and simulated using known software tools. These simulations are restricted to one specific aspect of the system, however. A power supply company may be able to perform a simulation for an electrical network, for example, but this simulation does not take into consideration maintenance or financial assets, for example. Using "co-simulation" (coupling to another simulation) allows details and the precision of the simulated aspect to be improved.

A genuine implementation of a "digital twin" should cover multiple aspects of a real system, however. This allows a complex simulation of the system, and a power supply company might have the following aspects, for example: electrical grid, maintenance, energy trade, financial assets, etc. Such a simulation allows a much more detailed insight into the dependencies between the individual aspects, increases understanding of the whole system and might allow global rather than local optimization for a specific aspect of the system.

BRIEF SUMMARY OF THE INVENTION

The present invention is based on the object of allowing such a simulation.

This object is achieved by the subjects of the independent patent claims. Advantageous embodiments of the present invention are described in the dependent claims.

According to a first aspect of the invention, a method for simulating a plurality of aspects of a system is described. The described method contains the following: (a) creating a plurality of models of a system, wherein each individual model describes a specific aspect of the system, (b) determining an initial first data record and an initial second data record for each model, wherein the initial first data record contains specific data that are used only by the model, and wherein the initial second data record contains common data that are used by the model and at least one other model, (c) selecting a first model and a second model from the plurality of models, (d) determining an updated first data record and an updated second data record for the first model on the basis of the initial first data record for the first model and the initial second data records, and (e) determining an updated first data record and an updated second data record for the second model on the basis of the initial first data record for the second model. The updated second data record for the first model and the initial second data records for all of the models in the plurality of models except for the first model.

The described method is based on the realization that following determination of initial first and second data records, the respective model-specific data and common data, for each model and selection of a first and a second model, a determination of updated first and second data records is performed for one of the selected models after the other. In other words, already updated data records for a (first) model are used for determining updated data records for a further (second) model. It is therefore possible for the dependencies between the individual aspects (models) to be both checked and influenced by a selection of the order of the models.

According to one exemplary embodiment of the invention, the selecting furthermore contains selecting a third model from the plurality of models and the method furthermore contains determining an updated first data record and an updated second data record for the third model on the basis of the initial first data record for the third model, the updated second data record for the first model, the updated second data record for the second model and the initial second data records for all of the models in the plurality of models except for the first model and the second model.

In other words, this exemplary embodiment involves a third model from the plurality of models also being selected in addition to the first and second models. Moreover, an updated first data record and an updated second data record are determined for this third model. This determination is based on the updated data records already determined (for the first and second models) and on the initial second data records for the third and all further models.

According to a further exemplary embodiment of the invention, the selecting of the first, the second and possibly the third model from the plurality of models is performed by a user.

The selecting of the models (and hence of the order in which the updated data records are determined) by the user is preferably affected as part of a configuration of a piece of simulation software.

According to a further exemplary embodiment of the invention, the method furthermore contains the following: (a) checking the updated first data records and the updated second data records and, on the basis of the checking: (b) again selecting a first model, a second model and possibly a third model from the plurality of models and (c) again determining updated first data records and updated second data records for the selected models.

This exemplary embodiment involves the updated data records being checked, for example by virtue of the user checking the data records or data derived (for example calculated) therefrom. If the result of the check is a divergence from expected or known values, the selecting of the models is performed again so that in particular a different order of the steps for determining the updated data records can be stipulated. If the previous selections made were a model A as first model, a model B as second model and a model C as third model, now the selections made are for example the model B as first model, the model A as second model and the model C as third model. After the models have been selected again, the updated data records are performed in accordance with the new selection in order to obtain a better match between simulation and reality as far as possible.

According to a further exemplary embodiment of the invention, the method furthermore contains the following: (a) determining a further updated first data record and a further updated second data record for the first model on the basis of the updated first data record for the first model and the updated second data records, and (b) determining a further updated first data record and a further updated second data record for the second model on the basis of the updated first data record for the second model, the further updated second data record for the first model and the updated second data records for all of the models in the plurality of models except for the first model.

This exemplary embodiment involves the previously determined updated data records being used as a basis for determining further updated data records.

According to a further exemplary embodiment of the invention, the method furthermore contains the following: determining a further updated first data record and a further updated second data record for the third model on the basis of the updated first data record for the third model, the further updated second data record for the first model, the further updated second data record for the second model and the updated second data records for all of the models in the plurality of models except for the first model and the second model.

According to a further exemplary embodiment of the invention, the updated first data records and the updated second data records correspond to a first time and the further updated first data records and the further updated second data records correspond to a second time, in particular a second time that comes after the first time.

In other words, the updated first and updated second data records represent the system at the first time, while the further updated first data records and the further updated second data records represent the system at the second time.

According to a second aspect of the invention, an apparatus for simulating a plurality of aspects of a system is described. The apparatus has a data memory and a processor, wherein the apparatus is configured to perform the method according to the first aspect or one of the exemplary embodiments above.

The apparatus according to the second aspect is configured to perform the method according to the first aspect and therefore provides the advantages explained above in connection with the first aspect for a user of the apparatus.

According to a third aspect of the invention, a computer program is described. The computer program has a plurality of computer-executable instructions that, when executed by a processor of a computer system, cause the processor to perform the method according to the first aspect or one of the exemplary embodiments above.

It is pointed out that embodiments of the invention have been described with reference to different subjects of the invention. In particular, some embodiments of the invention are described by means of method claims and other embodiments of the invention are described by means of apparatus claims. However, it will immediately become clear to a person skilled in the art upon reading this application that, unless explicitly indicated otherwise, any combination of features that can be attributed to different types of subjects of the invention is also possible in addition to a combination of features that can be attributed to one type of subject of the invention.

Other features which are considered as characteristic for the invention are set forth in the appended claims.

Although the invention is illustrated and described herein as embodied in a configurable digital twin, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

It is pointed out that the embodiments described below are merely a limited selection of possible variant embodiments of the invention.

Figure 1:
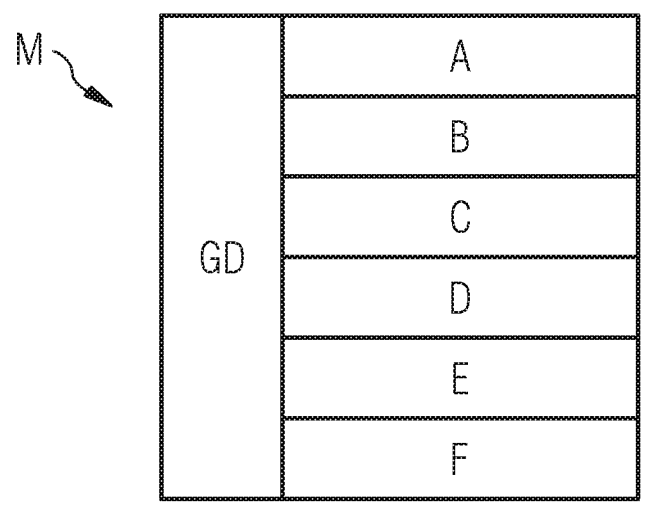
FIG. 1 is an illustration showing a model of a system having multiple aspects and common data according to an exemplary embodiment of the invention.

Referring now to the figures of the drawings in detail and first, particularly to FIG. 1 thereof, there is shown a model M of a system having multiple aspects A, B, C, D, E, F and common data GD according to an exemplary embodiment of the invention. The individual aspects A, B, C, D, E, F may be for example different aspects of a power supply company, such as for example a model of an electrical supply grid, a maintenance model, an energy trade model, a financial model, etc. Each model A, B, C, D, E, F uses at least some of the common data GD.

Figure 2:
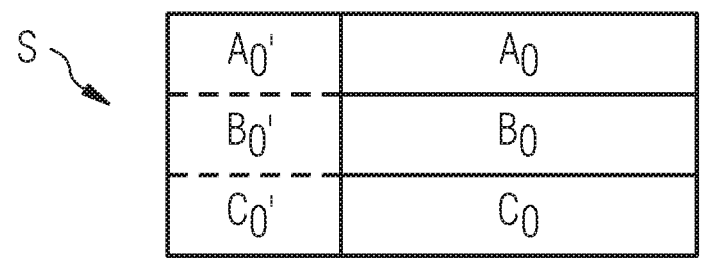
FIG. 2 is an illustration showing a data structure according to an exemplary embodiment of the invention.

FIG. 2 shows a data structure S according to an exemplary embodiment of the invention. In this example, the model contains three aspects A, B, C and the data structure has two data records for each aspect, namely a first data record containing model-specific data, i.e. data that are relevant only to the respective aspect, and a second data record containing common data, i.e. data that are relevant to the respective aspect and to at least one further aspect. More specifically, FIG. 2 shows a first data record A0 containing specific data for the aspect A and a second data record A0' containing common data for the aspect A and at least one of the two further aspects B, C. Similarly, FIG. 2 shows a first data record B0 containing specific data for the aspect B, a second data record B0' containing common data for the aspect B and at least one of the two further aspects A, C, a first data record C0 containing specific data for the aspect C and a second data record C0' containing common data for the aspect C and at least one of the two further aspects A, B. The fact that the data records A0', B0', C0' are common data records is depicted in FIG. 2 by dashed dividing lines.

Figure 3:
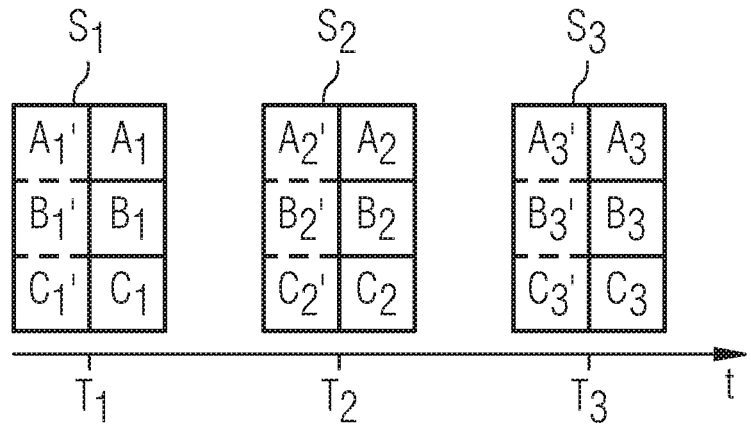
FIG. 3 is an illustration showing simulation data records for multiple successive times.

FIG. 3 shows simulation data records S1, S2, S3 for multiple successive times T1, T2, T3. More specifically, FIG. 3 shows a first simulation data record S1 containing first (model-specific) data records A1, B1, C1 and second (common) data records A1', B1', C1'. The simulation data record S1 represents the modelled system at the time T1. In the same manner, the second simulation data record S2 containing first data records A2, B2, C2 and second data records A2', B2', C2' represents the state of the modelled system at the later time T2. The third simulation data record S3 containing first data records A3, B3, C3 and second data records A3', B3', C3' represents the state of the modelled system at the even later time T3. The data records S1, S2, S3 are each calculated on the basis of preceding data records S0 (not shown), S1 and S2, as described in more detail below in conjunction with FIG. 4.

Figure 4:
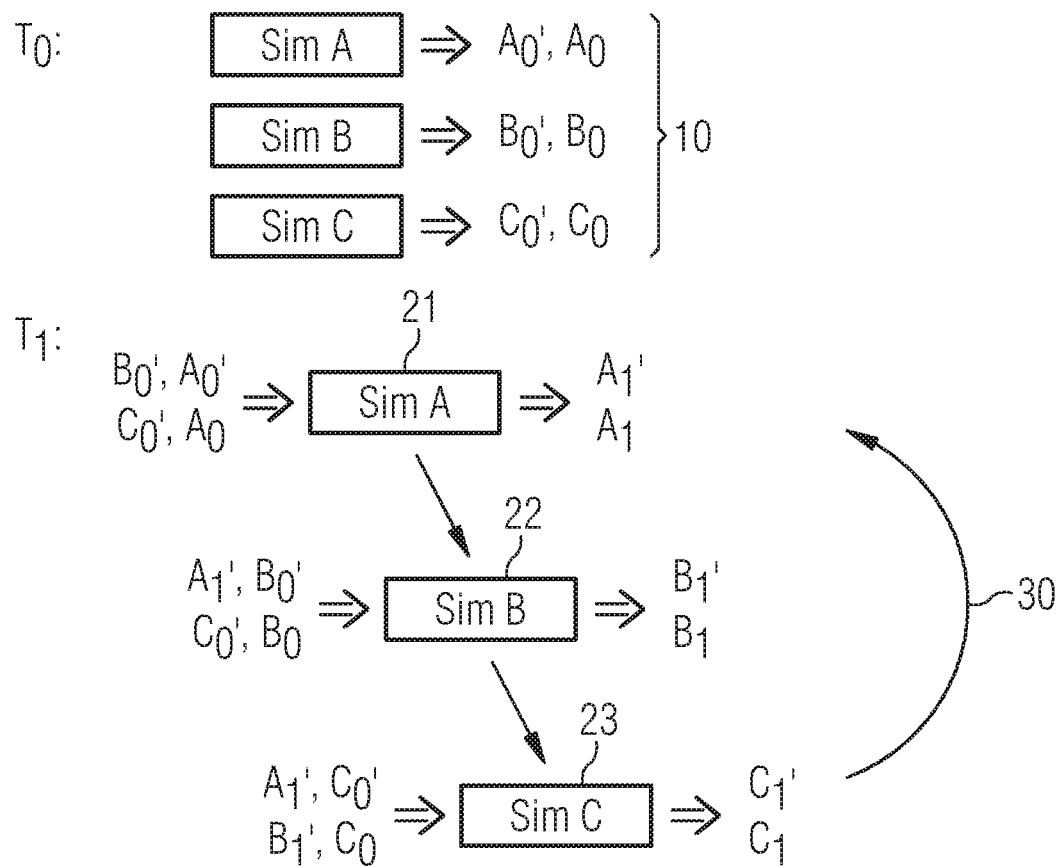
FIG. 4 is an illustration showing the sequence of a simulation and configuration process according to an exemplary embodiment of the invention.

FIG. 4 shows the flow of a configuration and simulation process according to an exemplary embodiment of the invention. Following creation of a plurality of models of a system describing specific aspects A, B, C of the system, an initial first data record A0, B0, C0 containing model-specific data (i.e. data that are used only by the respective model) and an initial second data record A0', B0', C0' containing common data (i.e. data that are used by the respective model and at least one further model) are respectively determined for each model A, B, C at the time T0 in method step 10. This is accomplished by inputting suitable starting values, which correspond to the time T0, for the individual models A, B, C and performing appropriate simulations, as indicated by "Sim A", "Sim B", "Sim C" in FIG. 4.

Next, updated data records are determined for each model at the subsequent time T1 as follows. The user selects one of the models or aspects A, B, C as a first model. In the example shown, the user selects the model A as first model and in method step 21 an updated first data record A1 containing updated model-specific data and an updated second data record A1' containing updated common data are determined for the model A. This determination is based on the initial model-specific data record A0 and the three common data records A0', B0', C0'.

A second model, in this example the model B, is now selected. This selecting can be performed together (i.e. simultaneously) with the selecting of the first model or only after method step 21. In method step 22, an updated first data record B1 containing updated model-specific data and an updated second data record B1' containing updated common data are determined for the selected second model B. This determination is based on the initial model-specific data record B0 for the model B, the updated second data record A1' for the first selected model A, determined previously in method step 21, and the initial second data records for all of the models except the first model A, i.e. the common data records B0', C0' for the models B and C.

Similarly, a third model, in this example the model C, is now selected. This can be accomplished together (i.e. simultaneously) with the selecting of the first and/or second model or only after method step 22. In method step 23, an updated first data record C1 containing updated model-specific data and an updated second data record C1' containing updated common data are determined for the selected third model C. This determination is based on the initial model-specific data record C0 for the model C, the updated second data record A1' for the first selected model A, determined previously in method step 21, the updated second data record B1' for the second selected model B, determined previously in method step 22, and the initial second data records for all of the models except the first model A and the second model B, i.e. the common data record C0' for the model C.

In systems having more than three aspects and corresponding models, the process is similar until updated first and second data records have been determined for all models.

After each individual determination step 21, 22, 23 an automatic check on the determined data records takes place. If the result of this automatic check is that inadmissible data, e.g. values outside a predefined range, have been determined then the applicable determination step 21, 22, 23 is repeated, the calculations on which the determination is based being changed or optimized where possible.

After all of the determination steps 21, 22, 23 have been performed successfully, the user then has the opportunity to check the updated data records and, if necessary, data derived (e.g. calculated) therefrom. If the result of this check is that the data are not, or appear not to be, reliable then method steps 21, 22, 23 are repeated as shown by the arrow 30, with the first, second and third models being selected by the user differently than previously in order to change the dependencies between the individual models.

The user can therefore easily configure the simulation program and thereby achieve an optimum simulation for the whole system with all aspects.

LIST OF REFERENCE SIGNS

M Model
GD Common data
A Aspect/model
B Aspect/model
C Aspect/model
D Aspect/model
E Aspect/model
F Aspect/model
S Data record
$A_{0'}$ Common data record
$A_0$ Model-specific data record
$B_{0'}$ Common data record
$B_0$ Model-specific data record
$C_{0'}$ Common data record
$C_0$ Model-specific data record
S1 Data record
$A_{1'}$ Common data record
$A_1$ Model-specific data record
$B_{1'}$ Common data record
$B_1$ Model-specific data record
$C_{1'}$ Common data record
$C_1$ Model-specific data record
T1 Time
S2 Data record
$A_{2'}$ Common data record
$A_2$ Model-specific data record
$B_{2'}$ Common data record
$B_2$ Model-specific data record
$C_{2'}$ Common data record
$C_2$ Model-specific data record
T2 Time
S3 Data record
$A_{3'}$ Common data record
$A_3$ Model-specific data record
$B_{3'}$ Common data record
$B_3$ Model-specific data record
$C_{3'}$ Common data record
$C_3$ Model-specific data record
T3 Time
10 Method step
21 Method step
22 Method step
23 Method step
30 Arrow

The invention claimed is:

1. A method for simulating a plurality of aspects of a system, the method comprises the steps of:
   creating a plurality of models of the system, wherein each individual model describes a specific aspect of the system;
   determining an initial first data record and an initial second data record for each of the models, wherein the initial first data record containing specific data used only by the model, and wherein the initial second data record containing common data used by the model and at least one other model;
   selecting a first model and a second model from the plurality of models;
   determining an updated first data record and an updated second data record for the first model on a basis of the initial first data record for the first model and initial second data records;
determining an updated first data record and an updated second data record for the second model on a basis of the initial first data record for the second model, the updated second data record for the first model and the initial second data records for all of the models in the plurality of models except for the first model;
   selecting a third model from the plurality of models;
   determining an updated first data record and an updated second data record for the third model on a basis of the initial first data record for the third model, the updated second data record for the first model, the updated second data record for the second model and the initial second data records for all of the models in the plurality of models except for the first model and the second model; and
   performing the selecting of the first model, the second model and the third model from the plurality of models by a user.

2. The method according to claim 1, which further comprises checking updated first data records and updated second data records and, on a basis of the checking:
   again selecting a new first model, a new second model and possibly a new third model from the plurality of models; and
   again determining updated first data records and updated second data records for selected new models.

3. The method according to claim 1, which further comprises:
   determining a further updated first data record and a further updated second data record for the first model on a basis of the updated first data record for the first model and updated second data records; and determining a further updated first data record and a further updated second data record for the second model on a basis of the updated first data record for the second model, the further updated second data record for the first model and the updated second data records for all of the models in the plurality of models except for the first model.

4. The method according to claim 3, which further comprises:
   determining a further updated first data record and a further updated second data record for the third model on a basis of the updated first data record for the third model, the further updated second data record for the first model, the further updated second data record for the second model and the updated second data records for all of the models in the plurality of models except for the first model and the second model.

5. The method according to claim 3, wherein the updated first data records and the updated second data records correspond to a first time and wherein further updated first data records and further updated second data records correspond to a second time.

6. An apparatus for simulating a plurality of aspects of a system, the apparatus comprising:
   a data memory; and
   a processor configured to perform a method as claimed in claim 1.

7. A non-transitory computer readable medium having a plurality of computer-executable instructions that, when executed by a processor of a computer system, cause said processor to perform a method for simulating a plurality of aspects of a system, the processor configured to:
   create a plurality of models of the system, wherein each individual model describes a specific aspect of the system;
   determine an initial first data record and an initial second data record for each of the models, wherein the initial first data record containing specific data used only by the model, and wherein the initial second data record containing common data used by the model and at least one other model;
   select a first model and a second model from the plurality of models;
   determine an updated first data record and an updated second data record for the first model on a basis of the initial first data record for the first model and initial second data records;
   determine an updated first data record and an updated second data record for the second model on a basis of the initial first data record for the second model, the updated second data record for the first model and the initial second data records for all of the models in the plurality of models except for the first model;
   select a third model from the plurality of models;
   determine an updated first data record and an updated second data record for the third model on a basis of the initial first data record for the third model, the updated second data record for the first model, the updated second data record for the second model and the initial second data records for all of the models in the plurality of models except for the first model and the second model; and
   perform the selecting of the first model, the second model and the third model from the plurality of models by a user.

* * * * *